(12) United States Patent
Hartman et al.

(10) Patent No.: US 7,015,608 B2
(45) Date of Patent: Mar. 21, 2006

(54) METHOD AND APPARATUS TO SUPPRESS ELECTRICAL NOISE IN A ROTOR ASSEMBLY FOR AN ELECTRICAL MACHINE

(75) Inventors: Roger A. Hartman, Indianapolis, IN (US); Michael D. Bradfield, Anderson, IN (US)

(73) Assignee: Delco Remy International, Inc., Anderson, IN (US)

( * ) Notice: Subject to any disclaimer, the term of this patent is extended or adjusted under 35 U.S.C. 154(b) by 0 days.

(21) Appl. No.: 10/899,739

(22) Filed: Jul. 27, 2004

(65) Prior Publication Data

US 2006/0022533 A1 Feb. 2, 2006

(51) Int. Cl.
*H02K 11/00* (2006.01)

(52) U.S. Cl. .................... 310/68 R; 310/51
(58) Field of Classification Search .......... 310/51, 310/68 R, 232, 234, 216, 254, 261
See application file for complete search history.

(56) References Cited

U.S. PATENT DOCUMENTS

| | | | | |
|---|---|---|---|---|
| 3,394,296 | A | * 7/1968 | Dotto | 318/138 |
| 4,268,770 | A | 5/1981 | Iwaki et al. | 310/72 |
| 4,459,499 | A | 7/1984 | Bonecker et al. | 310/68 R |
| 4,543,504 | A | 9/1985 | Iwaki et al. | 310/68 D |
| 4,570,094 | A | 2/1986 | Trommer | 310/68 D |
| 4,604,538 | A | * 8/1986 | Merrill et al. | 310/68 D |
| 5,043,836 | A | 8/1991 | Fukushima | 361/301 |
| 5,070,267 | A | 12/1991 | Sano et al. | 310/89 |
| 5,191,248 | A | 3/1993 | Huss | 310/68 D |
| 5,306,974 | A | 4/1994 | Bates | 310/68 R |
| 5,424,594 | A | 6/1995 | Saito et al. | 310/68 D |
| 5,550,415 | A | 8/1996 | Adachi et al. | 310/68 R |
| 5,717,270 | A | 2/1998 | Lau et al. | 310/220 |
| 5,905,319 | A | 5/1999 | McLendon | 310/68 R |
| 6,037,693 | A | 3/2000 | Marth et al. | 310/220 |
| 6,169,347 | B1 | * 1/2001 | Sakamoto et al. | 310/78 |
| 6,271,607 | B1 | 8/2001 | Vandenbossche | 310/68 D |
| 6,291,913 | B1 | 9/2001 | Nikawa et al. | 310/68 R |
| 6,396,175 | B1 | 5/2002 | Fujita et al. | 310/51 |
| 6,400,058 | B1 | 6/2002 | Liau | 310/239 |
| 6,476,535 | B1 | 11/2002 | Oohashi et al. | 310/263 |
| 6,580,194 | B1 | 6/2003 | Mizutani et al. | 310/239 |
| 2002/0047366 | A1 | 4/2002 | Allendorf et al. | 310/72 |
| 2002/0079751 | A1 | 6/2002 | Janisiewicz et al. | 310/51 |
| 2002/0140301 | A1 | 10/2002 | Kershaw et al. | 310/68 R |
| 2002/0149276 | A1 | 10/2002 | Borden et al. | 310/68 D |
| 2003/0075997 | A1 | 4/2003 | Keim et al. | 310/68 D |

* cited by examiner

*Primary Examiner*—Thanh Lam
(74) *Attorney, Agent, or Firm*—Cantor Colburn LLP

(57) ABSTRACT

A dynamoelectric machine includes a rotor having a rotor shaft; two flux carrying segments rotatably disposed on the rotor shaft; a field coil disposed between the two flux carrying segments, the field coil having a pair of coil leads; an insulative member disposed at one end of the shaft; a pair of slip rings longitudinally spaced on the insulative member and having respective coupling terminals; and a diode having a pair of diode leads, each diode lead electrically connected to one of the pair of coil leads of the field coil and to one of the respective coupling terminals, the diode configured to suppress electrical noise as a result of an interface between the pair of slip rings and respective brushes.

25 Claims, 4 Drawing Sheets

METHOD AND APPARATUS TO SUPPRESS ELECTRICAL NOISE IN A ROTOR ASSEMBLY FOR AN ELECTRICAL MACHINE

TECHNICAL FIELD

This application relates generally to an electrical apparatus. More specifically, this application relates to a method and apparatus to suppress electrical noise in a rotor assembly for an electrical machine.

BACKGROUND

Lundell alternators are used almost exclusively for passenger vehicle on-board electrical generation. A Lundell alternator includes a wound-field claw pole rotor that has the characteristic of satisfying most functional demands such as power output, size, and reliability in a cost effective manner. In a dynamoelectric machine having such a rotor, it is necessary to apply a voltage across the rotating field coil winding to produce a time varying magnetic field. A slip ring and brush arrangement is used to complete an electrical circuit between the rotating field coil winding and the stationary electronics of the alternator, particularly the voltage regulator.

In such an arrangement, two copper slip rings are mounted on a rotating shaft extending from the rotor and are electrically insulated from the shaft and each other through plastic material that supports the rings. Each ring is connected to one end of the field coil winding. The rings are cylindrical in shape and roughly about 5 to about 10 mm in axial length. An electrical brush rides, or more appropriately, slides, on a respective rotating slip ring. The two brushes are secured to a stationary frame of the alternator via a brush holder or similar structure, and are forced into direct, sliding contact with an exposed surface of a corresponding slip ring. A biasing member, such as a spring, is used to bias each brush in contact with a corresponding slip ring.

The two brushes are commonly solid carbon, or carbon-copper pieces that are typically rectangular in shape. The brushes are electrically connected to the rest of the alternator to provide the voltage across the field coil. During use, the slip rings rotate with the rotor shaft and the two brushes slide across the exposed surface of a corresponding slip ring to complete the electrical field circuit between the field coil winding and the alternator.

The electrical interface between the brush and respective slip ring, however, is not perfect. The brushes do not always make continuous, low-impedance contact with the slip rings due to vibration, surface roughness and roundness of the slip rings coupled with the rotational speeds of the rotor. Furthermore, the inductance of the field coil winding can lead to negative voltage spikes within the field circuit. Consequently, localized arcing and sparking occur between the slip rings and corresponding brushes. This in turn produces electrical noise that can be disruptive to other on-board vehicle electronics, such as the radio.

Accordingly, it is desired to suppress the electrical noise generated due to the aforementioned voltage spikes that occur as a result of the imperfect slip ring/brush interface.

BRIEF SUMMARY OF THE INVENTION

The above discussed and other drawbacks and deficiencies are overcome or alleviated by a dynamoelectric machine including a rotor composed of a rotor shaft; two flux carrying segments rotatably disposed on the rotor shaft; a field coil disposed between the two flux carrying segments, the field coil having a pair of coil leads; an insulative member disposed at one end of the shaft; a pair of slip rings longitudinally spaced on the insulative member and having respective coupling terminals; and a diode having a pair of diode leads, each diode lead electrically connected to one of the pair of coil leads of the field coil and to one of the respective coupling terminals, the diode configured to suppress electrical noise as a result of an interface between the pair of slip rings and respective brushes.

In an exemplary embodiment, a slip ring assembly for a dynamoelectric machine is disclosed. The slip ring assembly includes a pair of slip rings longitudinally spaced on a rotatable shaft along a longitudinal axis, the pair of slip rings have respective coupling terminals extending therefrom; and a diode having a pair of diode leads. Each diode lead is configured to be electrically connected to one of a pair of coil leads of a field coil and to one of the respective coupling terminals. The diode is configured to suppress electrical noise as a result of an interface between the pair of slip rings and respective brushes.

In another embodiment, an alternating current (AC) generator for a motor vehicle is disclosed. The generator includes a housing defining a drive end and an opposite slip ring end; a stator; a rotor shaft; two flux carrying segments rotatably disposed on the rotor shaft rotatable within the stator; a field coil disposed between the two flux carrying segments, the field coil having a pair of coil leads; an insulative member disposed at one end of the shaft; a pair of slip rings longitudinally spaced on the insulative member and having respective coupling terminals; and a diode having a pair of diode leads. Each diode lead is configured to be electrically connected to one of a pair of coil leads of a field coil and to one of the respective coupling terminals. The diode is configured to suppress electrical noise as a result of an interface between the pair of slip rings and respective brushes.

In yet another embodiment, a method to suppress electrical noise generated in a brush type rotor of a wound-field electrical machine is disclosed. The method includes connecting a diode in parallel with a field coil on a rotor side of a slip ring/brush interface.

DESCRIPTION OF THE PREFERRED EMBODIMENT

This disclosure relates to a diode mounted on the rotor of a wound-field electrical machine and connected in parallel with the field coil to suppress electrical noise as a result of negative voltage spikes. The invention significantly reduces electrical noise generated from the voltage spikes due to an imperfect slip ring/brush interface. In particular, the invention discloses the diode connected in parallel between the slip ring leads and the field leads, as well as being rotatable with a slip ring assembly to which it is attached.

Figure 1:
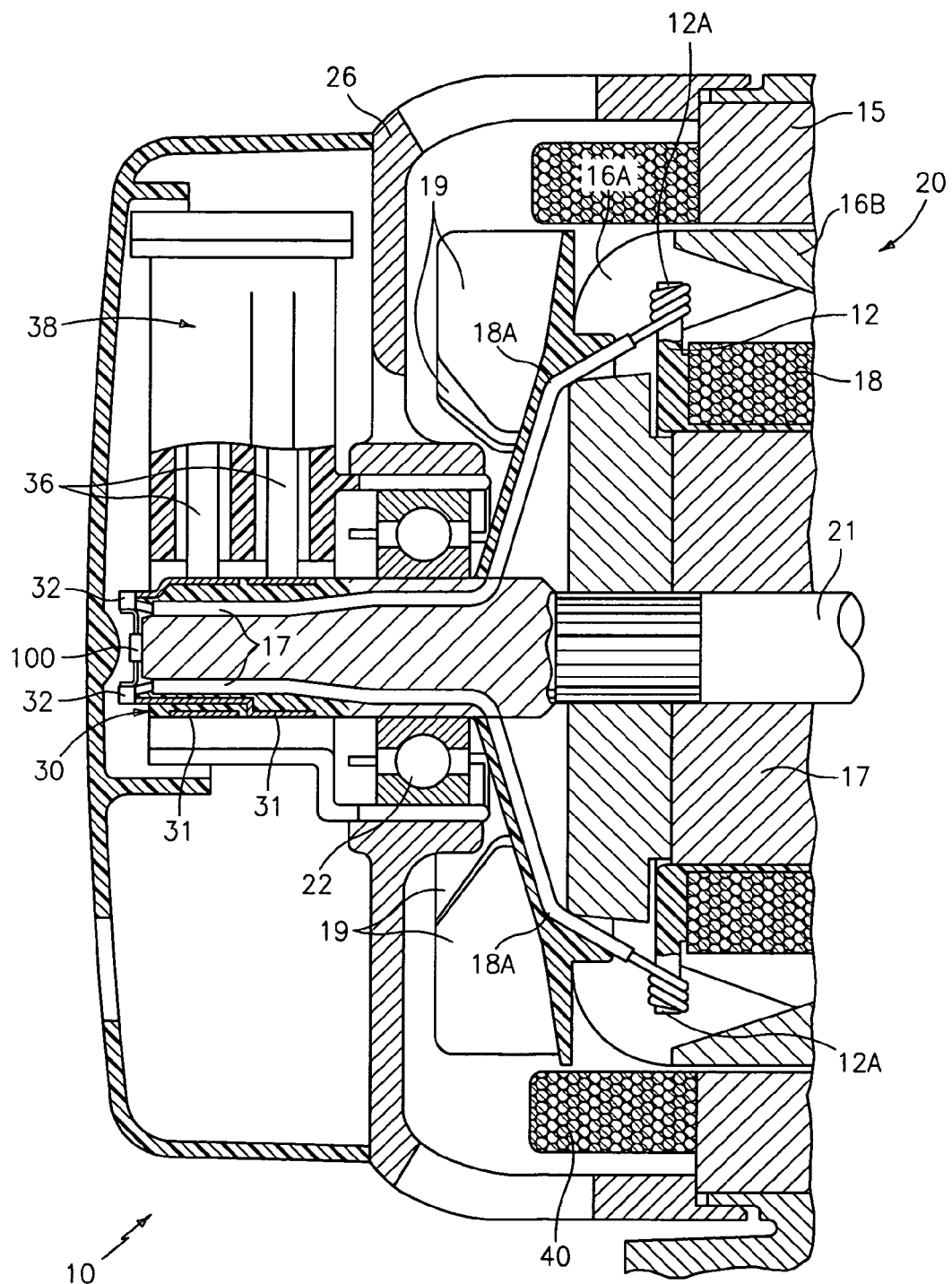
FIG. 1 is a partial sectional view through a Lundell alternator illustrating a noise suppression diode operably coupled to a slip ring assembly in accordance with an exemplary embodiment.

Referring now to FIG. 1, an alternator 10 has a rotor assembly generally designated by the reference numeral 20 and stator assembly generally designated by the reference numeral 15. The rotor assembly 20 includes a shaft 21 supporting all rotating magnetic circuit structures thereof including conventional pole-members or segments 16A and 16B, rotor core 17 and field coil 18 wound upon bobbin 12. Each segment 16A and 16B has P/2 claw poles where P is an even number and representative of the total number of poles. Additionally, all other non-magnetic circuit rotating structures are carried thereby, including air circulation fans 19 (only one shown) located at axially opposite sides of the pole-members, and a slip ring assembly 30 located at one extreme end of the shaft. One fan (not shown) is formed from sheet metal stock and spot welded to pole-member 16B while fan 19 is formed from an appropriate thermoplastic material and heat staked to tower extensions (not shown) from the field coil bobbin 12. The shaft 21 in turn is rotatably supported within a housing 26 by a pair of bearings 22 (only one shown). Bearing 22 (shown) is located between the slip ring assembly 30 and the fan 19.

Figure 2:
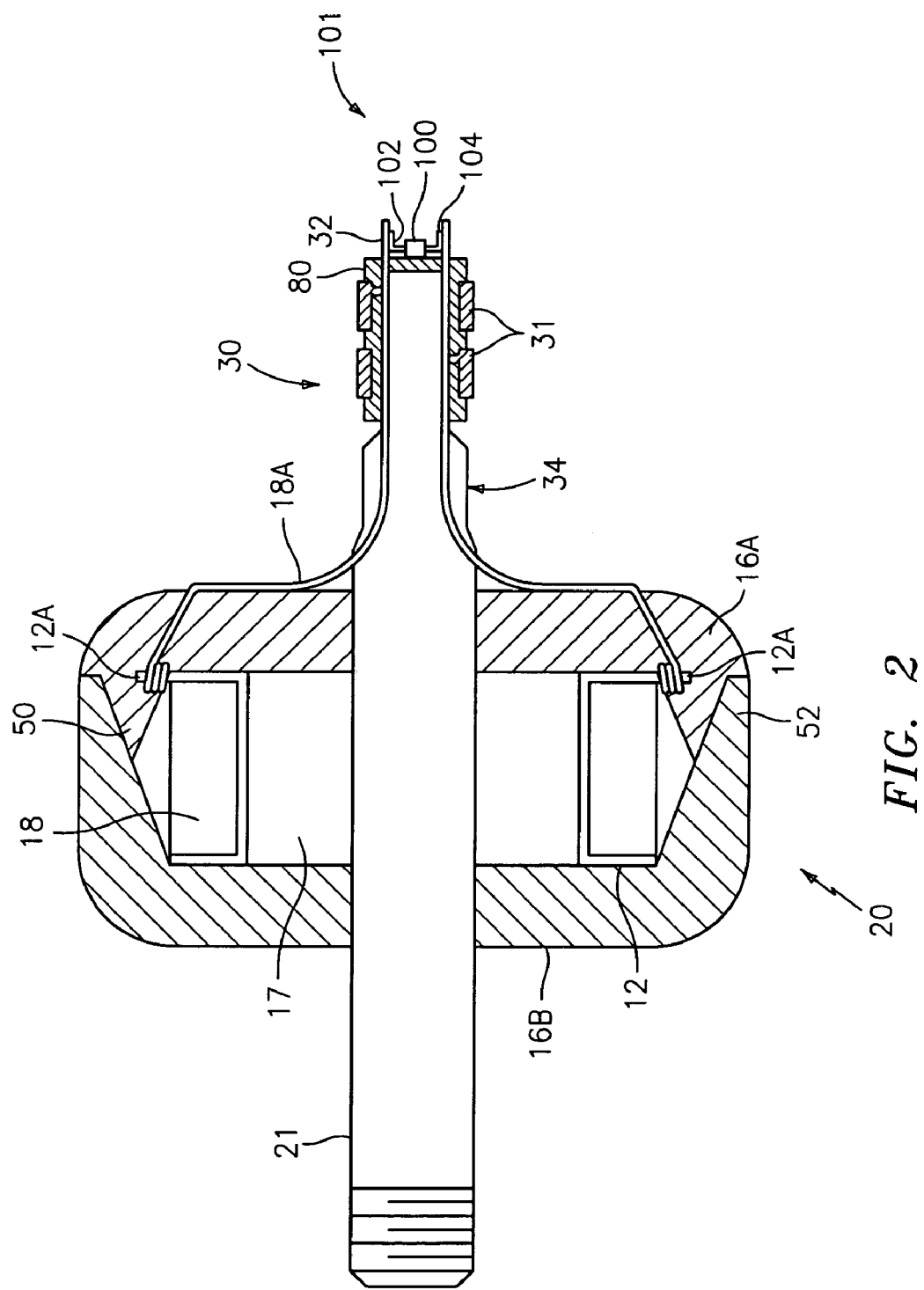
FIG. 2 is a partial sectional view of a rotor assembly of the alternator of FIG. 1 incorporating a noise suppression diode electrically connected in parallel to a corresponding slip ring of the slip ring assembly and field coil winding lead wire in accordance with an exemplary embodiment.

Still referring to FIG. 1 and with the aid of reference to FIG. 2, which shows a sectional view of the slip ring assembly 30 in accordance with the present invention assembled to the rotor shaft 21, certain features of the invention are abundantly more clear. Coil leads 18A of field coil 18 are wrapped about respective posts 12A of bobbin 12 and pass through holes configured in fan 19. Slip ring assembly 30 is made of a pair of copper rings 31, each having a slip ring lead 32 joined such as by welding thereto. The copper rings and wires are molded into a an insulative member 80, such as a molded cylinder of thermoset material, to complete the slip ring assembly. Slip ring assembly 30 is pressed onto the end of rotor shaft 21 and the slip ring leads 32 are routed into channels generally indicated at 34 in FIG. 2 along the shaft 21 where they are joined such as by soldering to the coil leads 18A of field coil 18.

Figure 3:
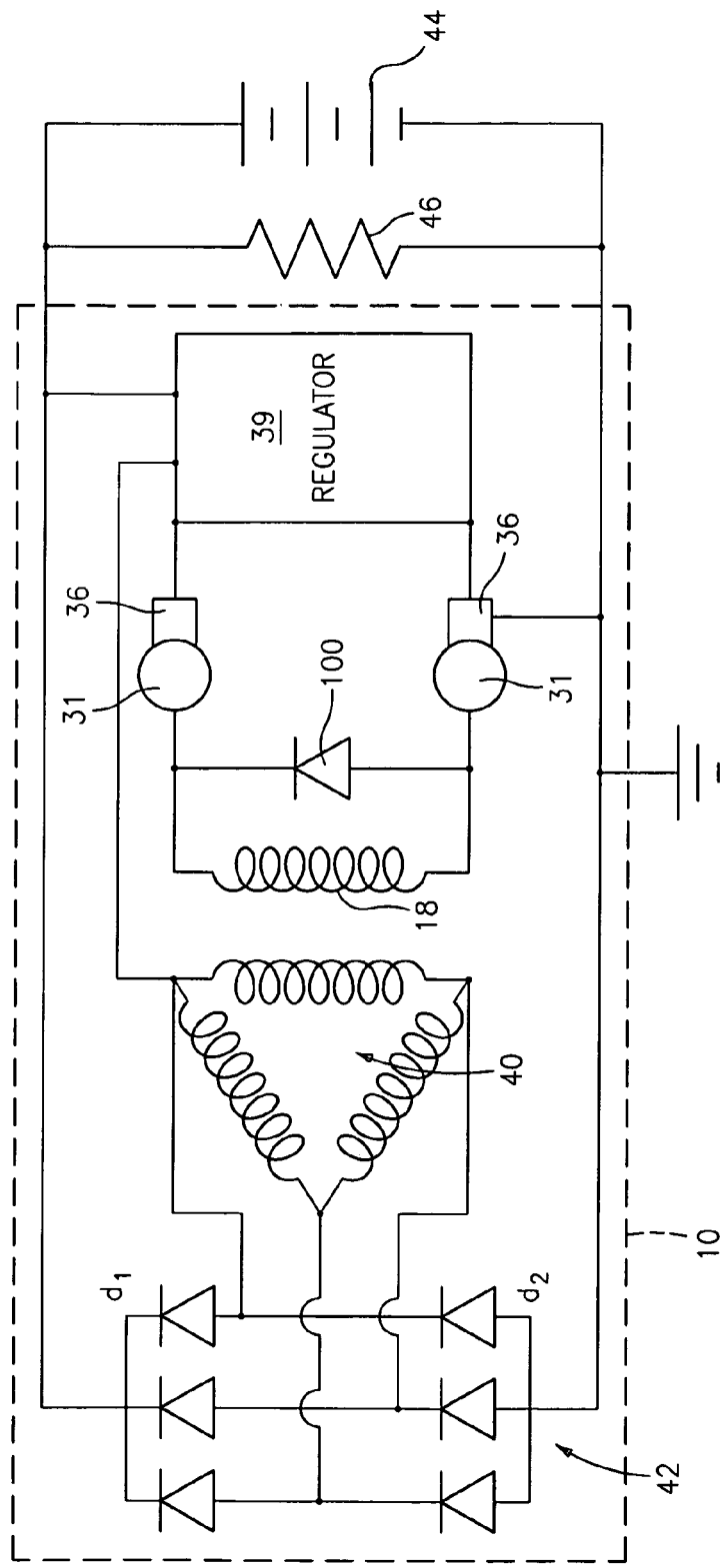
FIG. 3 is a circuit diagram of an exemplary embodiment of the rotor assembly of FIGS. 1–2 in electrical communication with a stator assembly, rectifier bridge, voltage regulator, vehicle loads and a battery in accordance with an exemplary embodiment.

Still referring to FIGS. 1 and 2 with the aid of FIG. 3, slip rings 31 are configured for supplying an electric current to the rotor assembly 20 via a pair of brushes 36 being housed in a brush holder 38 disposed inside housing 26 so as to slide in contact with these slip rings 31. A voltage regulator 39 (FIG. 3) for adjusting the magnitude of an alternating voltage generated in a stator winding 40 of stator assembly 15 is operably coupled with the brush holder 38. Slip ring assembly 30 includes a noise suppression diode 100 operably mounted to an exposed end or one end 101 defining assembly 30. Leads 102 and 104 extending from diode 100 are electrically connected in parallel with coil leads 18a at a location where coil leads 18a are electrically connected with slip ring leads 32 extending from end 101 of slip ring assembly 30. In an exemplary embodiment, noise suppression diode has an axial lead configuration and is capable of handling voltages up to about thirty volts (30V).

A rectifier 42 for converting alternating current generated in the stator 40 into direct current is mounted inside housing 26, the rectifier 42 being constituted by a three-phase full-wave rectifier in which three diode pairs, respectively, are connected in parallel, each diode pair being composed of a positive-side diode $d_1$ and a negative-side diode $d_2$ connected in series (see FIG. 3). Output from the rectifier 42 can be supplied to a storage battery 44 and an electric load 46.

As described above, the rotor assembly 20 is constituted by: the field winding 18 for generating a magnetic flux on passage of an electric current; and pole cores or segments 16A and 16B disposed so as to cover the field winding 18, magnetic poles being formed in the segments 16A and 16B by the magnetic flux generated by the field winding 18. The segments 16A and 16B are preferably made of iron, having two first and second claw-shaped magnetic poles 50 and 52, respectively, disposed on an outer circumferential edge and offsetly aligned with each other in a circumferential direction so as to project axially, and the end segment pole cores 5 and 52 are fixed to the shaft 21 facing each other such that the claw pole of one core is aligned with a gap defined between contiguous claw poles of the other core and intermesh with the opposing magnetic poles of the other core as is well known in the art of Lundell rotor assemblies.

In the dynamoelectric machine 10 constructed in this manner, an electric current is supplied to the field winding 18 during start up from the storage battery 44 through the brushes 36 and the slip rings 31, generating a magnetic flux. After the alternator turns on and begins to produce power, the alternator internally provides the field current. The first claw-shaped magnetic poles 50 of segment 16A are magnetized into a fixed polarity by this magnetic flux (such as North seeking (N) poles), and the second claw-shaped magnetic poles 52 of segment 16B are magnetized into the opposite polarity (such as South-seeking (S) poles). At the same time, rotational torque from the engine is transmitted to the shaft 21, by means of the belt (not shown) and the pulley (not shown), rotating the rotor assembly 20. Thus, a rotating magnetic field is imparted to the armature winding 40 of stator assembly 15, inducing a voltage across the armature winding 40. An alternating-current electromotive force from induced voltage across armature winding 40 passes through rectifier 42 and is converted into direct current, the magnitude thereof is adjusted by the voltage regulator 39, storage battery 44 is charged, and the current is supplied to the electrical load 46.

Figure 4:
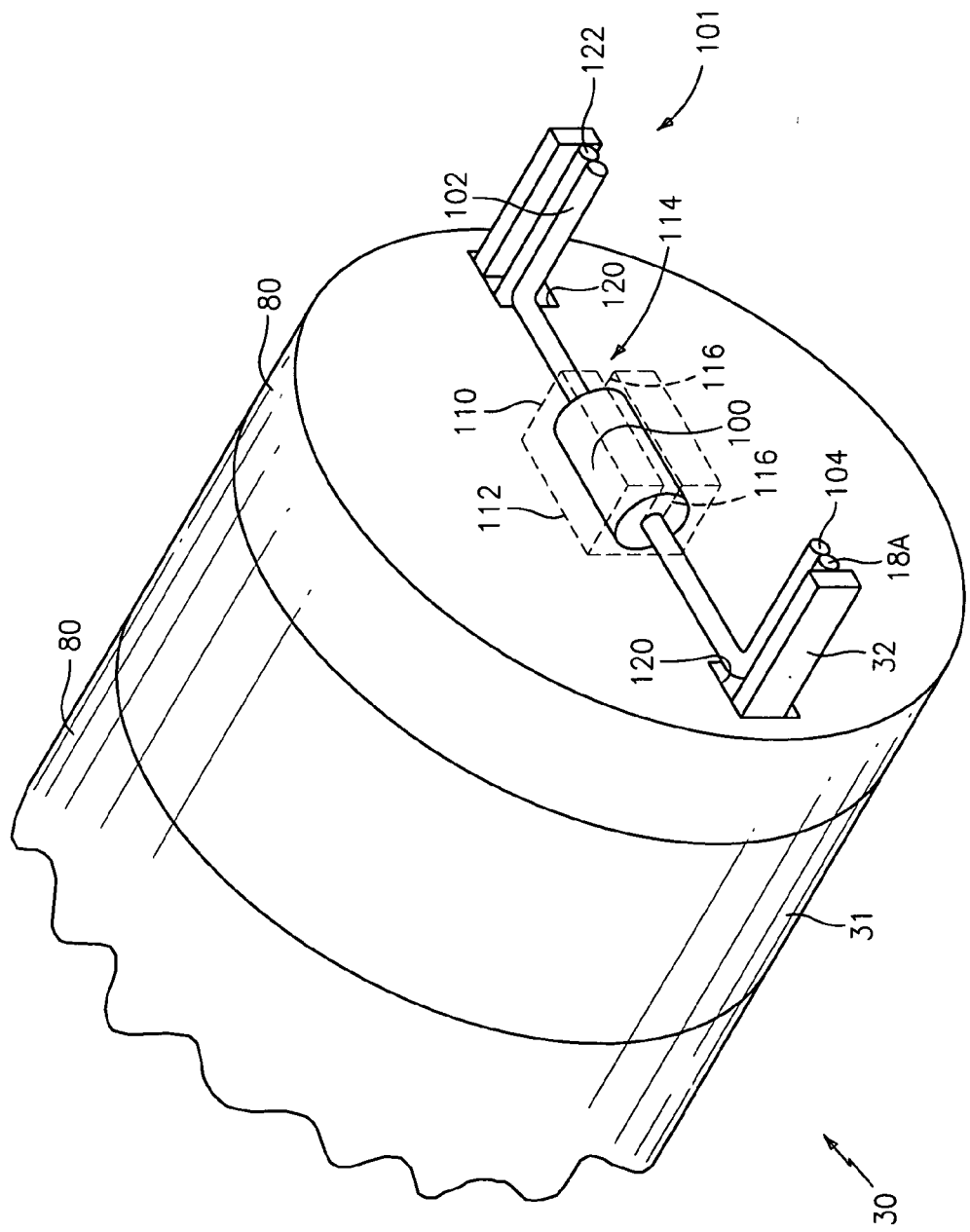
FIG. 4 is an enlarged perspective view of a right hand side of the rotor assembly of FIG. 2 illustrating connection of the noise suppression diode and respective leads extending therefrom in accordance with an exemplary embodiment.

Referring now to FIG. 4, slip ring assembly 30 of FIGS. 1–3 may include insulative member 80 molded from plastic, including Polyphenylene Sulfide, having the desired creep and dimensional characteristics for molding a net dimensioned assembly and also having appropriate tensile and impact characteristics. The slip rings 31 may be manufactured using a conventional cold forming process, each slip ring 31 being continuous about its respective circumference and having an appropriate length terminal 32 extending therefrom. The slip rings 31 are insert molded into the slip ring assembly 30, the slip ring terminals 32 serving as a first locating feature, and the outside diameter of the slip rings 31 serving as second locating feature. A conventional straight pull mold may be used to produce the slip ring assembly.

In an exemplary embodiment as depicted in FIG. 4, slip ring assembly 30 includes a molded support wall 110 extending from end 101 for supporting diode 100. Support wall 110 includes a molded block assembly 112 having a cavity 114 configured therein to receive a body portion of diode 100 and includes slots 116 disposed at opposing ends of block assembly 112 to allow corresponding diode leads 102 and 104 to extend therefrom and allow ingress and egress of the diode leads 102 and 104 from block assembly 112. Support wall 110 is configured to retain diode 100 while shaft 21 rotates slip ring assembly 30 mounted thereto.

End 101 of assembly 30 includes opposing apertures 120 configured to allow corresponding slip ring lead terminals 32 and a respective field lead 18A to extend therethrough for electrical connection with a respective diode lead 102, 104 generally indicated at 122.

If necessary, excess insulating material may be stripped where the coil leads 18A exit the end of the slip ring assembly through apertures 120 and each coil lead is secured to a respective one of the slip ring terminals 32 at 122. Preferably, the slip ring terminals 32 are crimped around the diameter of the coil leads and diode leads 102, 104 and then welded or soldered. This electrical connection connects the diode in parallel with the field coil and suppresses the voltage spikes that occur as a result of an imperfect slip ring/brush interface.

Significant alternator assembly advantages are realized with a slip ring assembly as described. The disclosed invention solves the technical problem at minimal cost versus the alternatives. It also allows use of a brush type construction that has significant performance and size advantages over a brushless construction. Disposing a diode connected across the field coil winding allows for dissipation of voltage spikes that may be generated as a conductive state of the interface between the brushes and corresponding slip rings varies during operation of the generator.

While incorporation of the exemplary noise suppression diode with a slip ring assembly has been described for use with generators associated with vehicles, the same may also be used and incorporated in applications other than generators for a vehicle where suppression or reduction of electrical noise is desired.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A slip ring assembly for an automotive alternator comprising:
    a pair of slip rings longitudinally spaced on an automotive alternator rotor shaft along a longitudinal axis, said pair of slip rings having respective coupling terminals extending therefrom; and
    a diode having a pair of diode leads, each diode lead configured to be electrically connected to one of a pair of coil leads of a field coil disposed on said rotor shaft and to one of said respective coupling terminals, said diode configured to suppress electrical noise as a result of an interface between said pair of slip rings and respective brushes, said diode disposed on a rotor shaft side of said slip ring/brush interface.

2. The assembly of claim 1, wherein said pair of slip rings is longitudinally spaced on said rotor shaft via an insulative member operably coupled to said shaft.

3. The assembly of claim 1, wherein said diode is rotatable with said rotor shaft.

4. The assembly of claim 1, wherein said insulative member is a molded cylinder having a cavity to receive said shaft, said exposed end of said cylinder includes a diode receptacle configured to retain said diode and allow rotation thereof relative to said cylindrical member.

5. The assembly of claim 4, wherein said diode receptacle includes a block assembly extending from said exposed end defining said cylinder, said block assembly defining a cavity to retain said diode therein and slots configured in opposing walls defining said block assembly to allow ingress and egress of said diode leads for connection with one of said pair of coil leads.

6. The assembly of claim 5, wherein said pair of slip rings is insert molded with said cylinder.

7. The assembly of claim 6, wherein said cylinder is molded plastic.

8. The assembly of claim 5, wherein each of said respective coupling terminals and said pair of coil leads extending from said exposed end extend from one of two opposing apertures configured in said exposed end to align with said pair of diode leads for connection therewith.

9. A rotor far an automotive alternator comprising:
    an automotive alternator rotor shaft;
    two flux carrying segments rotatably disposed on said rotor shaft;
    a field coil disposed between said two flux carrying segments, said field coil having a pair of coil leads;
    an insulative member disposed at one end of said shaft;
    a pair of slip rings longitudinally spaced on said insulative member and having respective coupling terminals; and
    a diode having a pair of diode leads, each diode lead electrically connected to one of said pair of coil leads of said field coil and to one of said respective coupling terminals, said diode configured to suppress electrical noise as a result of an interface between said pair of slip rings and respective brushes, said diode disposed on a rotor shaft side of said slip ring/brush interface.

10. The machine of claim 9, wherein said diode is rotatable with said rotor shaft.

11. The machine of claim 9, wherein said insulative member is a molded cylinder having a cavity to receive said shaft, said exposed end of said cylinder includes a diode receptacle configured to retain said diode and allow rotation thereof relative to said cylindrical member.

12. The machine of claim 11, wherein said diode receptacle includes a block assembly extending from said exposed end defining said cylinder, said block assembly defining a cavity to retain said diode therein and slots configured in opposing walls defining said block assembly to allow ingress and egress of said diode leads for connection with one of said pair of coil leads.

13. The machine of claim 12, wherein said pair of slip rings is insert molded with said cylinder.

14. The machine of claim 13, wherein said cylinder is molded plastic.

15. The machine of claim 12, wherein each of said respective coupling terminals and said pair of coil leads extending from said exposed end extend from one of two opposing apertures configured in said exposed end to align with said pair of diode leads for connection therewith.

16. An automotive alternator comprising:
    a housing defining a drive end and an opposite slip ring end;
    a stator;
    an automotive alternator rotor shaft;
    two flux carrying segments rotatably disposed on said rotor shaft rotatable within said stator;

a field coil disposed between said two flux carrying segments, said field coil having a pair of coil leads;

an insulative member disposed at one end of said shaft;

a pair of slip rings longitudinally spaced on said insulative member and having respective coupling terminals; and a diode having a pair of diode leads, each diode lead configured to be electrically connected to one of said pair of coil leads of said field coil and to one of said respective coupling terminals, said diode configured to suppress electrical noise as a result of an interface between said pair of slip rings and respective brushes, said diode disposed on a rotor shaft side of said slip ring/brush interface.

17. The generator of claim 16, wherein said diode is rotatable with said rotor shaft.

18. The generator of claim 16, wherein said insulative member is a molded cylinder having a cavity to receive said shaft, said exposed end of said cylinder includes a diode receptacle configured to retain said diode and allow rotation thereof relative to said cylindrical member.

19. The generator of claim 18, wherein said diode receptacle includes a block assembly extending from said exposed end defining said cylinder, said block assembly defining a cavity to retain said diode therein and slots configured in opposing walls defining said block assembly to allow ingress and egress of said diode leads for connection with one of said pair of coil leads.

20. The generator of claim 19, wherein said pair of slip rings is insert molded with said cylinder.

21. The generator of claim 20, wherein said cylinder is molded plastic.

22. The generator of claim 19, wherein each of said respective coupling terminals and said pair of coil leads extending from said exposed end extend from one of two opposing apertures configured in said exposed end to align with said pair of diode leads for connection therewith.

23. A method to suppress electrical noise generated in a brush type rotor of a wound-field automotive alternator, the method comprising:

connecting a diode in parallel with a field coil on a rotor shaft side of a slip ring/brush interface; and, disposing said diode on an exposed end of a slip ring assembly rotable with an automotive alternator rotor shaft.

24. The method of claim 23, further comprising:

connecting leads extending from said diode with a corresponding field coil lead of said field coil and a respective coupling terminal extending from a corresponding slip ring.

25. The method of claim 24, wherein said connecting leads includes crimping each said respective coupling terminal around a corresponding field coil lead and diode lead.

* * * * *